(12) United States Patent
Hansen

(10) Patent No.: US 6,259,231 B1
(45) Date of Patent: Jul. 10, 2001

(54) RAPID BATTERY CHARGER

(75) Inventor: Graydon C. Hansen, Kennesaw, GA (US)

(73) Assignee: R G Technology Ventures, LLC, Duluth, GA (US)

(*) Notice: Subject to any disclaimer, the term of this patent is extended or adjusted under 35 U.S.C. 154(b) by 0 days.

(21) Appl. No.: 09/714,401

(22) Filed: Nov. 16, 2000

(51) Int. Cl.[7] ................................................ H01M 10/44
(52) U.S. Cl. ............................................................ 320/131
(58) Field of Search .................................. 320/130, 131, 320/139, 141, 161

(56) References Cited

U.S. PATENT DOCUMENTS

| | | |
|---|---|---|
| 3,617,851 | 11/1971 | DuPuy et al. |
| 5,694,023 | 12/1997 | Podrazhansky et al. |
| 5,808,447 | 9/1998 | Hagino. |
| 5,945,811 | 8/1999 | Hasegawa et al. |
| 5,998,968 | 12/1999 | Pitman et al. |
| 6,060,865 | 5/2000 | Chen. |

*Primary Examiner*—Edward H. Tso
(74) *Attorney, Agent, or Firm*—Bryan W. Bockhop; Bockhop & Reich, LLP

(57) ABSTRACT

In a method of charging a battery cell, having a positive terminal and a negative terminal, a charging current is applied to the battery cell. A voltage is measured between the positive terminal and the negative terminal. The charging current is removed from the battery cell at a predetermined period subsequent to when the voltage changes at a rate, relative to time, that is not greater than a predetermined threshold. A battery cell charger for charging a battery cell includes a charger circuit, capable of applying a charging current to the battery cell, a voltage sensor circuit that measures a voltage between the positive terminal and the negative terminal and a charger control circuit that is responsive to the voltage sensor. The charger circuit directs the charger circuit to apply the charging current to the battery cell while the voltage changes at a rate, relative to time, that is greater than a predetermined threshold and directs the charger circuit to cease to apply the charging current to the battery cell at a predetermined period subsequent to when the voltage changes at a rate, relative to time, that is not greater than a predetermined threshold.

8 Claims, 2 Drawing Sheets

RAPID BATTERY CHARGER

BACKGROUND OF THE INVENTION

1. Field of the Invention

The present invention relates to battery chargers and, more specifically, to a rapid battery charger.

2. Description of the Prior Art

Battery chargers for lead-acid batteries typically apply a charge current to a battery cell or cells under charge. The charge current drives an electro-chemical reaction that causes lead ions to precipitate out of an electrolytic solution onto a metal plate. Once a maximum amount of lead is removed from the solution, the battery is said to be "fully charged."

FIG. 1 shows a graph of a typical charging cycle for a battery. The x-axis 106 represents time and the y-axis represents both voltage 102 and current 104. The charge cycle comprises an application of a charging current pulse 120, a rest period 114 and the application of a depolarization pulse 116. Several consecutive charge cycles may be employed to charge a battery.

Initially, when a current (represented by a dotted line on the graph) is applied to a fully discharged battery the voltage (represented by a solid line) across the battery terminals is low, but increases at a very high rate relative to time 110. Eventually, the voltage levels off 112 and the rate of change, relative to time, approaches zero. At this point the efficiency of the charger is very low. This is due to the formation of a layer of lead-poor electrolyte forming around the metal plate to which the lead ions are precipitating. This layer is referred to as the "Helmholz" layer. As the Helmholz layer thickens, the rate of lead precipitation decreases. While one could apply a higher voltage to the charging current to increase precipitation, such a voltage would give rise to an increased level of heat production in the battery and, thus, a higher level of electrolyte evaporation.

The depolarization pulse 116 is applied to break up the Helmholz layer. Generally, the depolarization pulse 116 is a short pulse that forces the lead-poor electrolyte molecules away from the metal plate to which the lead is precipitating. Once the Helmholz layer is dissipated, normal charge current may again be applied with higher efficiency.

Many prior art chargers apply charging current pulses of fixed duration. During a portion 118 of the charging period 120, characterized by a rate of voltage change relative to time approaching zero, the Helmholz layer is relatively thick and less efficient charging is taking place. During this portion 118, most of the energy being applied to the battery is wasted in the form of heat.

Therefore, there is a need for a battery charger that senses when the rate at which voltage changes relative to time is near zero and that ceases to apply current near that time.

SUMMARY OF THE INVENTION

The disadvantages of the prior art are overcome by the present invention which, in one aspect, is a method of charging a battery cell, having a positive terminal and a negative terminal in which a charging current is applied to the battery cell. A voltage is measured between the positive terminal and the negative terminal. The charging current is no longer applied to the battery cell at a predetermined period subsequent to when the voltage changes at a rate, relative to time, that is not greater than the predetermined threshold.

In another aspect, the invention is a battery cell charger that includes a charger circuit capable of applying a charging current to the battery cell. A voltage sensor circuit measures a voltage between the positive terminal and the negative terminal of the battery cell. A charger control circuit is responsive to the voltage sensor and directs the charger circuit to apply the charging current to the battery cell while the voltage changes at a rate, relative to time, that is greater than a predetermined threshold. The charger control circuit also directs the charger circuit to cease to apply the charging current to the battery cell at a predetermined period subsequent to when the voltage changes at a rate, relative to time, that is not greater than the predetermined threshold.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
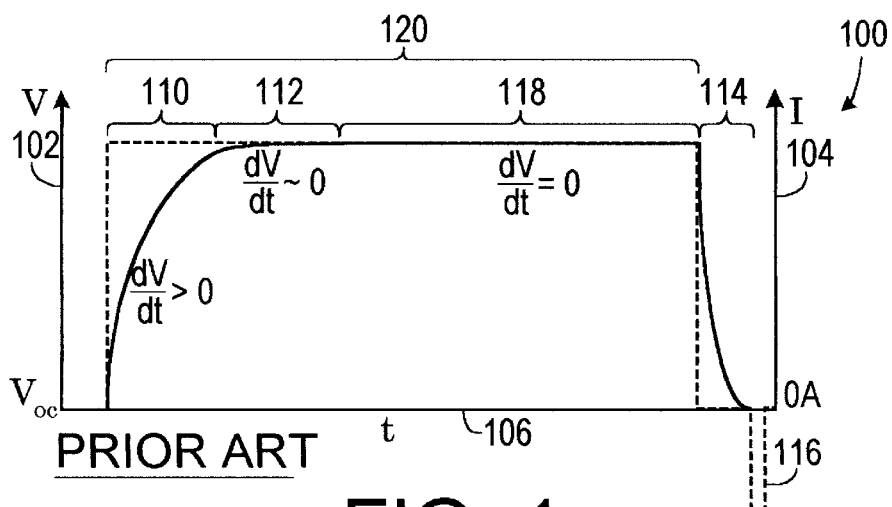
FIG. 1 is a graph of a voltage and current profile produced by a prior art battery charger.

A preferred embodiment of the invention is now described in detail. Referring to the drawings, like numbers indicate like parts throughout the views.

U.S. Pat. No. 3,617,851, issued to Du Puy, et al., is hereby incorporated by reference into the present disclosure.

Figure 2:
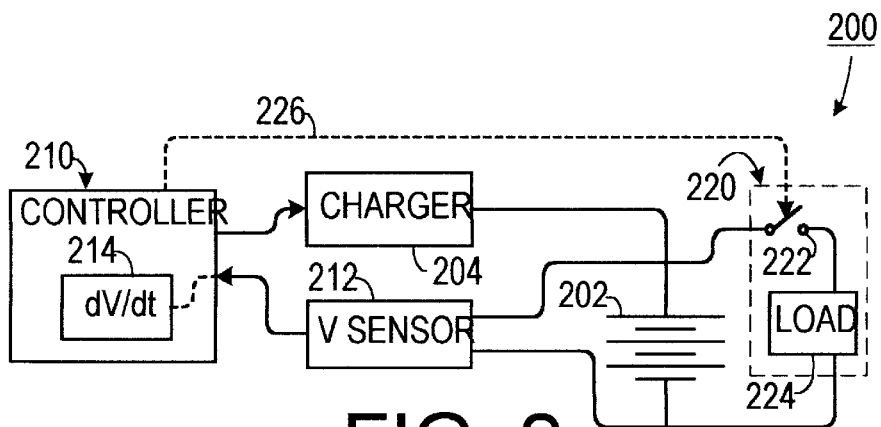
FIG. 2 is a schematic diagram of one embodiment of the invention.

As shown in FIG. 2, one embodiment of the invention is a battery cell charger 200, for charging a battery cell 202 (or plurality thereof), having a positive terminal and a negative terminal. In one application, the battery cell 202 is a lead-acid battery. A charger circuit 204 is capable of applying a charging current to the battery cell 202 and a voltage sensor circuit 212 measures a cell voltage between the positive terminal and the negative terminal of the battery cell 202. The charger control circuit 210 includes a derivative-determining portion 214 that calculates the time derivative of the cell voltage based on the input from the voltage sensor 212. The derivative-determining circuit 214 could be embodied in several ways, including: through a software routine resident in the controller 210, in which case it would generate a digital approximation of the time derivative of the voltage; through dedicated digital hardware (also generating a digital approximation); or through an analog differentiating circuit, which would generate an analog derivative value.

The charger control circuit 210 directs the charger circuit 204 to apply the charging current to the battery cell 202 while the voltage changes at a rate, relative to time, that is greater than a predetermined threshold. The charger control circuit 210 also directs the charger circuit 204 to cease to apply the charging current to the battery cell 202 at a predetermined period subsequent to when the voltage changes at a rate, relative to time, that is not greater than the predetermined threshold.

Once the derivative-determining circuit 210 determines that the rate at which the voltage changes has been below the predetermined threshold for a predetermined period, then the controller 210 causes a depolarization pulse to be applied to the battery cell 202. Such a pulse is generated by a depolarization circuit 220 that includes a load 224 that may be coupled to the battery cell 202 via a switching circuit 222. The load 224 would typically be included as part of the controller 210, but is shown in FIG. 2 as being separate for the sake of clarity. The load 224 is electrically coupled to either the positive terminal or the negative terminal of the battery cell 202 and the switching element 222, which could be a transistor, electrically couples the other terminal of the battery cell 202 to the load 224. The switching element 222 is responsive to a depolarization signal 226 from the charger control circuit 210 so that when the depolarization signal 226 is asserted the load provides a loaded current path from one terminal of the battery cell 202 to the opposite terminal.

Figure 3:
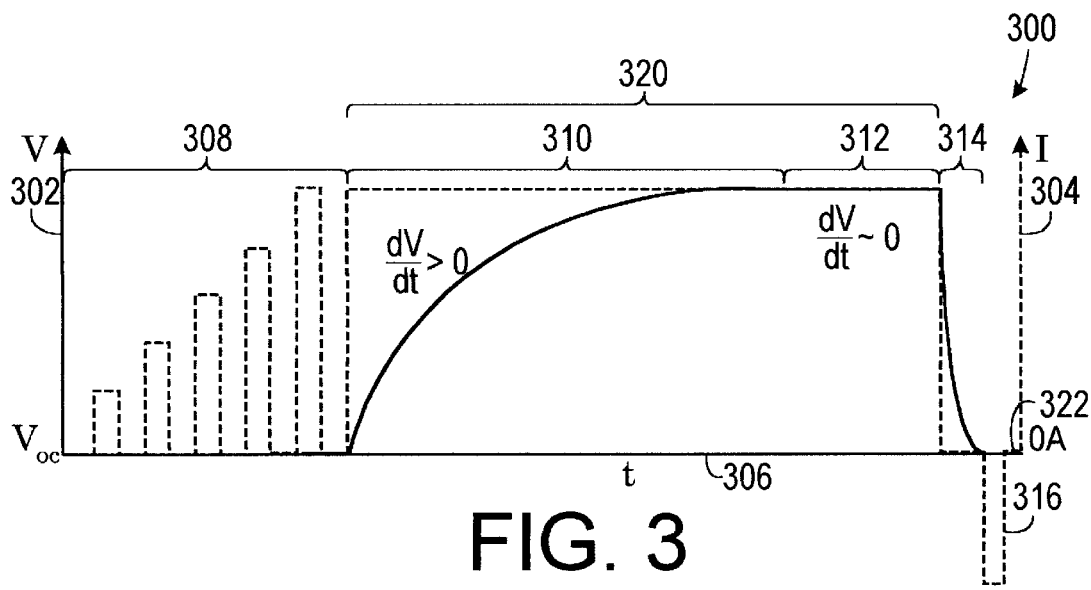
FIG. 3 is a graph of a voltage and current profile produced by a battery charger according to the invention.

A graph 300 of a charging cycle according to the invention is shown in FIG. 3. The x-axis 306 represents time and the y-axis represents both voltage 302 and current 304. During the charging period 320, the charger initially applies charging current (represented by a dashed line) 310 to the battery cell and the voltage (represented by a solid line) across the battery terminals increases at a high rate relative to time. At a certain point, the rate at which voltage increases approaches zero. Once this occurs, the controller continues to apply charging current for a preselected amount of time 312 and then enters a rest period 314, for a preselected amount of time, in which the voltage returns to $V_{oc.}$ and the current approaches zero. After the rest period 314, one or more depolarization pulses 316 is applied to the battery cell, with a rest period 322 allowed between each pulse 316.

Figure 4:
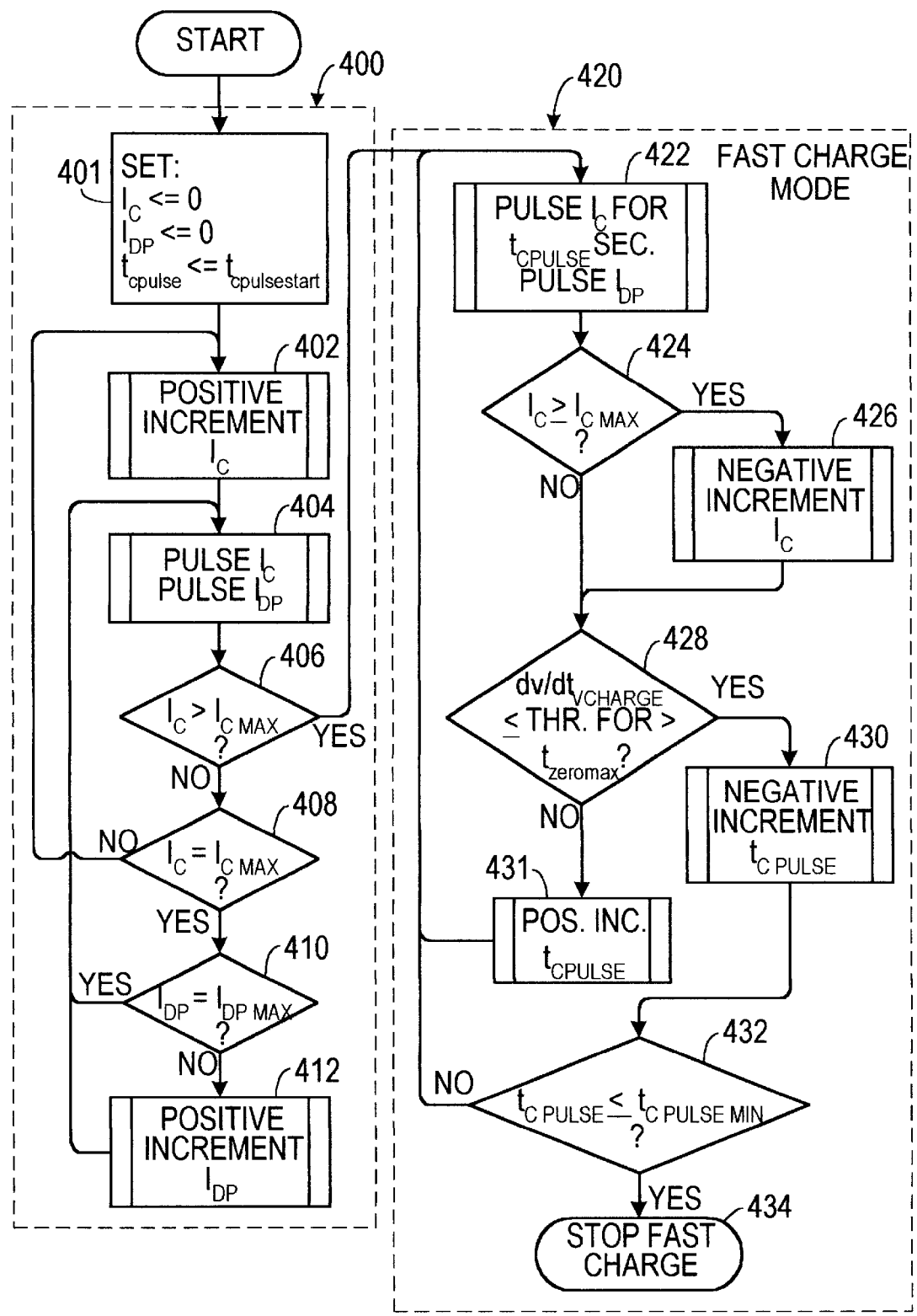
FIG. 4 is a flow chart that represents an illustrative embodiment of a method according to the invention.

A flow chart that could be used to program the controller is shown in FIG. 4. The system first enters a ramp up mode 400, in which the controller initializes several variables 401, such as the charge current, the depolarization current and the pulse time. The charge current is incremented 402 by a step that is equal to a fraction of the maximum charge current. A charge current pulse is applied then a depolarization pulse is applied 404 and the system determines 406 if the charge current has exceeded a predetermined maximum charge current. If it has, then the system enters the fast charge mode 420, otherwise it determines 408 if the charge current equals the predetermined maximum charge current. If the result of test 408 is "no," then control returns to block 402 and if it is "yes," then the system determines if the depolarization current equals a second predetermined maximum. If the result of test 410 is "no," then the depolarization current is incremented 412, otherwise control returns to block 404.

Once the charge current is determined to be greater than the maximum charge current 406, then the fast charge mode 420 is entered. In the fast charge mode 420 a charging pulse is applied for the current value of the pulse period and then a depolarization pulse is applied 422. A test 424 is performed to determine if the charge current is greater than the maximum charge current and, if so, the charge current is decremented 426. Next, the system determines if the time derivative of the charge voltage (or a digital approximation thereof) has been less than or equal to a predetermined threshold value for more than a preselected period of time. If not, the pulse length is incremented 431 and control returns to block 422. Otherwise, the pulse length is decremented 430 and the system performs a test 432 to determine if the pulse length is less than or equal to a preselected minimum pulse length. If the pulse length has not reached its minimum, then control passes to block 422, otherwise the system exits the fast charge mode 434.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of charging a battery cell, having a positive terminal and a negative terminal, comprising the steps of:

a. applying a charging current to the battery cell;

b. measuring a voltage between the positive terminal and the negative terminal; and c. ceasing to apply the charging current to the battery cell at a predetermined period subsequent to when the voltage changes at a rate, relative to time, that is not greater than the predetermined threshold.

2. The method of claim 1, further comprising the step of applying at least one depolarization current pulse, opposite in direction to the charging current, to the selected terminal of the battery cell after the ceasing step.

3. The method of claim 2, wherein the applying step occurs after a predetermined rest period.

4. The method of claim 1, wherein the battery cell comprises a lead-acid battery.

5. A battery cell charger, for charging a battery cell, having a positive terminal and a negative terminal, comprising:

a. a charger circuit, capable of applying a charging current to the battery cell;

b. a voltage sensor circuit that measures a voltage between the positive terminal and the negative terminal;

c. a charger control circuit, responsive to the voltage sensor, that directs the charger circuit to apply the charging current to the battery cell while the voltage changes at a rate, relative to time, that is greater than a predetermined threshold and that directs the charger circuit to cease to apply the charging current to the battery cell at a predetermined period subsequent to when the voltage changes at a rate, relative to time, that is not greater than the predetermined threshold.

6. The battery cell charger of claim 5, further comprising a depolarization circuit.

7. The battery cell charger of claim 6, wherein the depolarization circuit comprises:

a. a load that electrically coupled to a first selected terminal of the positive terminal or the negative terminal of the battery; and b. a switching element that electrically couples a second selected terminal of the positive terminal or the negative terminal, different from the first selected terminal, to the load, the switching element being responsive to a depolarization signal from the charger control circuit.

8. The battery cell charger of claim 5, wherein the battery comprises a lead-acid battery.

* * * * *